(12) United States Patent
Onda et al.

(10) Patent No.: US 8,584,148 B2
(45) Date of Patent: Nov. 12, 2013

(54) TERMINAL DEVICE AND PROGRAM

(75) Inventors: Yasushi Onda, Tokyo (JP); Izua Kano, Tokyo (JP); Dai Kamiya, Tokyo (JP); Yusuke Kushida, Tokyo (JP); Keiichi Murakami, Tokyo (JP); Eiju Yamada, Tokyo (JP); Kazuhiro Yamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 480 days.

(21) Appl. No.: 12/527,938

(22) PCT Filed: Feb. 20, 2008

(86) PCT No.: PCT/JP2008/052841
§ 371 (c)(1),
(2), (4) Date: May 6, 2011

(87) PCT Pub. No.: WO2008/114565
PCT Pub. Date: Sep. 25, 2008

(65) Prior Publication Data
US 2011/0209161 A1    Aug. 25, 2011

(30) Foreign Application Priority Data

Feb. 20, 2007   (JP) ................. 2007-039608

(51) Int. Cl.
*G06F 13/00* (2006.01)
(52) U.S. Cl.
USPC ........................................ 719/329
(58) Field of Classification Search
USPC ........................................ 719/329
See application file for complete search history.

(56) References Cited

U.S. PATENT DOCUMENTS

| | | | |
|---|---|---|---|
| 6,724,400 B1 * | 4/2004 | Anderson | 715/764 |
| 2002/0015042 A1 | 2/2002 | Robotham et al. | |
| 2002/0032677 A1 | 3/2002 | Morgenthaler et al. | |
| 2002/0112597 A1 | 8/2002 | Shibata et al. | |
| 2003/0135748 A1 | 7/2003 | Yamada et al. | |
| 2004/0158813 A1 | 8/2004 | Xia et al. | |
| 2005/0044191 A1 * | 2/2005 | Kamada et al. | 709/223 |

FOREIGN PATENT DOCUMENTS

| | | |
|---|---|---|
| JP | 10214179 | 8/1998 |
| JP | 10222584 | 8/1998 |
| JP | 11272809 | 10/1999 |
| JP | 2005198039 | 7/2005 |
| JP | 2006164005 | 6/2006 |
| JP | 2006350624 | 12/2006 |

OTHER PUBLICATIONS

Kei Sakaki, Lets begin! Japan, Jun. 18, 2001, vol. 194, pp. 122-132.

(Continued)

*Primary Examiner* — Andy Ho
(74) *Attorney, Agent, or Firm* — MKG, LLC (57) ABSTRACT

A terminal device in which basic information and detailed information of each a plurality of application programs are stored in a different storage area for each application program, and that prohibits access to each storage area by other application programs, is caused to execute the processes of displaying a window that includes the basic information of each application program, and, if a cursor is moved to the display position of one of the pieces of basic information, reading out, from the appropriate storage areas, the detailed information of a first application program corresponding to the basic information where the cursor is positioned and the detailed information of a second application program whose basic information is displayed adjacent to the basic information of the first application program, and displaying the detailed information of the first application program.

9 Claims, 4 Drawing Sheets (56) References Cited

OTHER PUBLICATIONS

Toro Moriyama, Practical use and choice of the I-appli, The use is wide, but there are many restrictions, Nikkei Open System, Japan, Mar. 15, 2001, No. 96, pp. 164-171.

Japanese Office Action for JP Patent Application Serial No. 2007-039608 dated Oct. 14, 2011.
Kunimoto, Mitsumasa "Practice it right now! I initiate you into the construction method of a secure public server: Chapter 4, enhance security of an email server with postfix"; Jul. 1, 2005, pp. 65-76.

* cited by examiner

TERMINAL DEVICE AND PROGRAM

FIELD OF THE INVENTION

The present invention relates to a terminal device having a program execution function, and more particularly to a terminal device for performing display of information relating to application programs stored thereon.

BACKGROUND OF THE INVENTION

In recent years, following the spread of mobile telephones provided with a program execution function, various types of application programs, such as schedulers and games, for example, have been provided for mobile phones. Users of such mobile phones can now select application programs that meet their individual needs, and install the selected application programs on their mobile phones.

With mobile phones provided with a program execution function, predetermined unique information (hereinafter, basic information) about application programs installed thereon, such as the names and types of application programs, is generally displayed as a list and the user allowed to select an application program to be run. Here, it is useful to be able to display information that has been added or updated (hereinafter, detailed information) following use of each application program, such as the usage history of the application program.

Because detailed information as mentioned above is generally generated in the process of executing an application program, to enable the display of detailed information, the application program needs to be run whenever a display instruction is performed. However, since the CPU (Central Processing Unit) of a mobile phone having a program execution function has low performance compared with the CPU of a personal computer or the like, a long time is required for the application program to finish startup, and it may not be possible to perform display of detailed information quickly.

Various techniques for speeding up information display have already been proposed, an example of which includes a technique disclosed in JP-A-2005-198039. In JP-A-2005-198039, a technique is disclosed for shortening the required processing time leading up to display, by reading out and readying other image data from storage means in accordance with a prescribed order of priority, while one piece of image data is being displayed.

SUMMARY

There are application programs for mobile phones that allow mobile phones to implement a prepaid electronic money function, a point card function and a credit card function (hereinafter, these functions will be collectively referred to as an "IC card function"), for example. The detailed information of this type of application program may include information whose security needs to be ensured, such as information showing when and for how much items were purchased on credit, for example.

Thus, with regard to an application program that deals with information whose security needs to be ensured, such as an application program that allows a mobile phone to implement an IC card function, the storage destination of information generated or updated in the execution process is generally limited to a storage area unique to that application program, and an access restriction prohibiting other application programs from accessing that storage area is imposed. With respect to a mobile phone on which this type of access restriction has been performed, the technique disclosed in JP-A-2005-198039 cannot be directly applied.

The present invention has been made in consideration of the above problem, and provides a technique for enabling the display of detailed information of an application program to be performed quickly, while ensuring security for the detailed information.

The present invention provides a terminal device including: display means; control means; operating means; and storage means in which a different storage area is allocated to each of a plurality of application programs, each of the storage areas storing detailed information and basic information, the detailed information being information that is added or updated following use of the application program, the basic information including predetermined unique information about the application program, wherein the control means is configured to execute: a first process of prohibiting, with respect to each storage area, access by application programs other than the allocated application program; a second process of causing the display means to display a window that includes the basic information of each of the plurality of application programs; a third process of moving a cursor to a position where one of the pieces of basic information is displayed in the window, according to content of an operation on the operating means; a fourth process of reading out, from the storage means, the detailed information of a first application program corresponding to the basic information where the cursor is positioned in the third process, and the detailed information of a second application program whose basic information is displayed in a vicinity of the basic information of the first application program in the window; and a fifth process of displaying the detailed information about the first application program on the display means.

According to this terminal device, the display of detailed information of an application program is performed more quickly, while ensuring security for the detailed information.

In embodiments of the present invention, a terminal device can be provided that includes display means, control means, operating means, and storage means for storing a unique ADF (Application Descriptor File) for each of a plurality of Java™ application programs, the ADF of each Java application program having described therein detailed information, which is information that is added or updated following use of the Java application program, and basic information that includes predetermined unique information about the Java application program. The control means executes a first process of prohibiting, with respect to each ADF, access by Java application programs other than the Java application program corresponding to the ADF, under control of a JAM (Java Application Manager), a second process of reading out the basic information of each of the plurality of application programs from the ADFs stored in the storage means, and causing the display means to display a window that includes the basic information, under control of the JAM, a third process of moving a cursor to a position where one of the pieces of basic information is displayed in the window, according to content of an operation on the operating means, a fourth process of reading out, from the ADFs stored in the storage means, the detailed information of a first application program corresponding to the basic information where the cursor is positioned in the third process, and the detailed information of a second application program whose basic information is displayed in a vicinity of the basic information of the first application program in the window, under control of the JAM, and a fifth process of displaying the detailed information about the first application program on the display means.

According to this terminal device, the display of detailed information of an application program is performed quicker, while ensuring security for the detailed information.

The basic information may include a digest that is generated from the detailed information, in addition to the predetermined unique information.

The control means may execute a sixth process of updating an application program, and a seventh process of rewriting, with regard to the basic information of the application program updated in the sixth process, pre-update content to post-update content, and not rewriting, with regard to the detailed information of the updated application program, pre-update content to different content.

Also, the control means may execute a sixth process of updating a Java application program, by acquiring an ADF and further acquiring a JAR file in accordance with content described in the ADF, and a seventh process of rewriting, with regard to the basic information of the Java application program updated in the sixth process, content described in the pre-update ADF to content described in the ADF acquired at the time of update, and describing, with regard to the detailed information of the updated application program, content described in the pre-update ADF in the ADF acquired at the time of update.

In a preferred embodiment, the control means, in the fifth process, runs the first application program and causes the display means to display the detailed information thereof. In an alternative preferred embodiment, the control means, in the fifth process, causes the display means to display the window that includes the detailed information of the first application program.

The present invention can also provide a program for causing a computer device to execute a first procedure of prohibiting, with respect to each ADF (Application Descriptor File) in storage means for storing a unique ADF for each of a plurality of Java application programs, the ADF of each Java application program having described therein detailed information, which is information that is added or updated following use of the Java application program, and basic information that includes predetermined unique information about the Java application program, access by application programs other than the allocated application program, under control of a JAM (Java Application Manager), a second procedure of causing display means to display a window that includes the basic information of each of the plurality of application programs, a third procedure of moving a cursor to a position where one of the pieces of basic information is displayed in the window, according to content of an operation on operating means, a fourth procedure of reading out, from the storage means, the detailed information of a first application program corresponding to the basic information where the cursor is positioned in the third procedure, and the detailed information of a second application program whose basic information is displayed in a vicinity of the basic information of the first application program in the window, and a fifth procedure of displaying the detailed information of the first application program on the display means.

According to this program, the display of detailed information of an application program is performed quicker, while ensuring security for the detailed information.

The present invention can also provide a program for causing a computer device to execute a first procedure of prohibiting, with respect to each storage area in storage means in which a different storage area is allocated to each of a plurality of application programs, and stored in the storage area allocated to each application program are detailed information, which is information that is added or updated following use of the application program, and basic information that includes predetermined unique information about the application program, access by application programs other than the allocated application program, a second procedure of reading out the basic information of each of the plurality of application programs from the ADFs stored in the storage means, and causing the display means to display a window that includes the basic information, under control of the JAM, a third procedure of moving a cursor to a position where one of the pieces of basic information is displayed in the window, according to content of an operation on operating means, a fourth procedure of reading out, from the ADFs stored in the storage means, the detailed information of a first application program corresponding to the basic information where the cursor is positioned in the third procedure, and the detailed information of a second application program whose basic information is displayed in a vicinity of the basic information of the first application program in the window, under control of the JAM, and a fifth procedure of displaying the detailed information about the first application program on the display means.

According to this program, the display of detailed information of an application program is performed quicker, while ensuring security for the detailed information.

Figure 1:
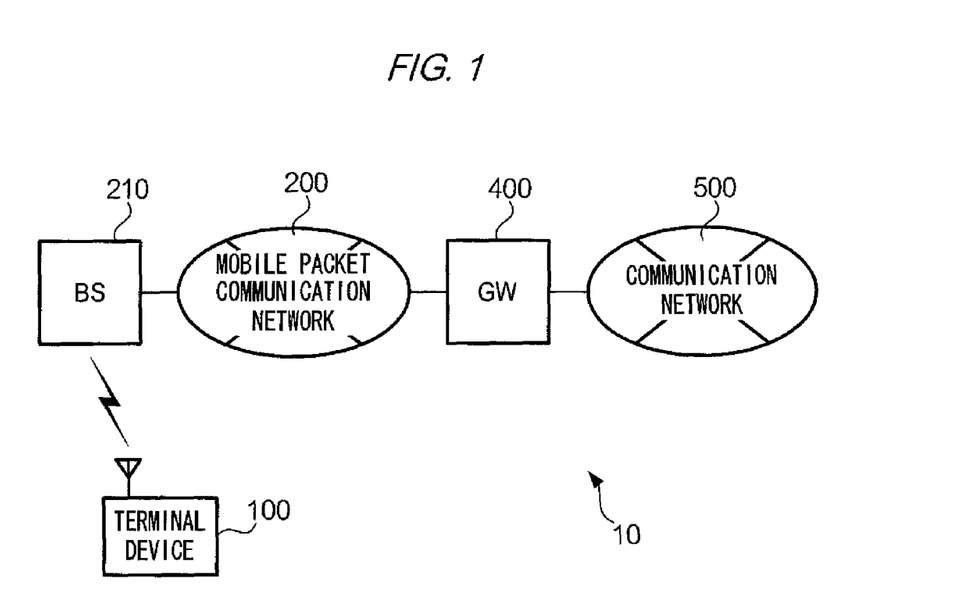
FIG. 1 shows an exemplary configuration of a communication system 10 according to an exemplary embodiment.

FIG. 1 is a block diagram showing an exemplary configuration of a communication system 10 that includes a terminal device 100 according to an exemplary embodiment of the present invention. As shown in FIG. 1, the communication system 10 includes the terminal device 100, which is a mobile phone that is provided with a program execution function, for example, a mobile packet communication network 200 that is capable of accommodating this terminal device 100, and a communication network 500 that is connected to the mobile packet communication network 200 via a gateway (hereinafter, denoted as "GW") 400.

The communication network 500 is the Internet, for example, and has connected thereto a content server (not shown) that provides an information retrieval service and various digital content (e.g., application programs). While this process will be described in detail below, a user of the terminal device 100 is able to download a desired application program from the content server by appropriately operating the terminal device 100, and store the downloaded application program on the terminal device 100.

Note that while the case where the communication network 500 is the Internet is described in the present embodiment, the communication network 500 may be a LAN (Local Area Network).

The GW 400 mediates communication between the terminal device 100 accommodated in the mobile packet communication network 200 and the content server connected to the communication network 500, and is provided with a function of performing mutual conversion of communication protocols in the mobile packet communication network 200 and communication protocols in the communication network 500. Note that a detailed description of the GW 400 will be omitted, since the configuration thereof is no different from a typical gateway device.

The mobile packet communication network 200, which accommodates the terminal device 100 and provides a wireless communication service, includes a base station (hereinafter, denoted as "BS") 210 that establishes a wireless link with the terminal device 100. Note that while a single BS is illustrated in FIG. 1, the mobile packet communication network 200 actually includes a plurality of BSs.

The BS 210, which is disposed per cell obtained by dividing the ground into a plurality of cells having a prescribed size (e.g., 500 meter radius), establishes a wireless link with a terminal device within the cell thereof and accommodates that terminal device. The BS 210 receives data transmitted from the terminal device accommodated thereby, and sends the data to the mobile packet communication network 200 to which the BS 210 is connected. Further, the BS 210 receives data transmitted from the mobile packet communication network 200 addressed to the terminal device, and wirelessly sends the data to the cell that is under the control of the BS 210.

Figure 2:
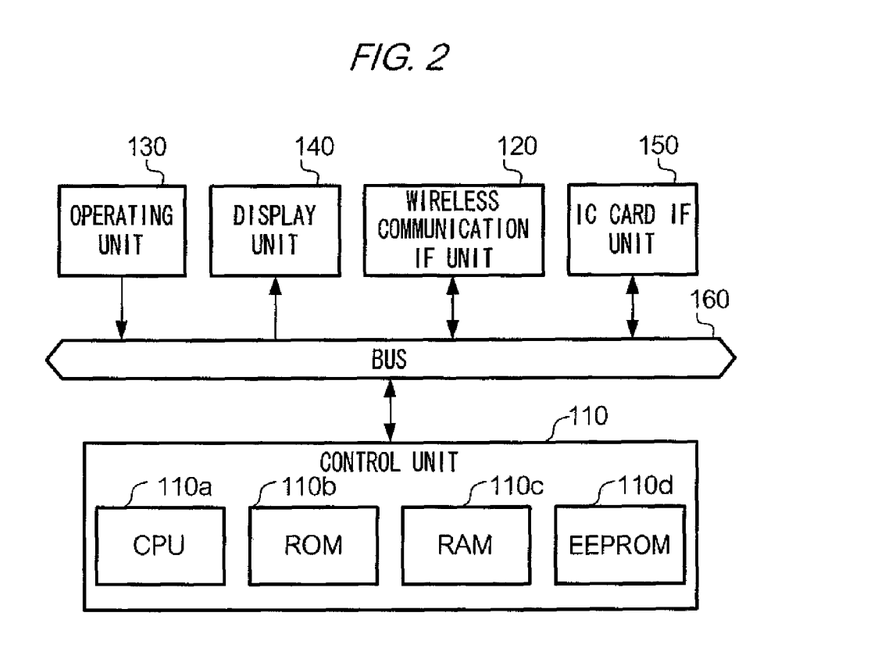
FIG. 2 is a block diagram showing an exemplary hardware configuration of a terminal device 100.

The terminal device 100 of FIG. 1 is provided with a control unit 110, a wireless communication interface (hereinafter, "IF") unit 120, an operating unit 130, a display unit 140, an IC card IF unit 150, and a bus 160 that mediates data transfer between these constituent elements, as shown in FIG. 2, in addition to a configuration (e.g., voice communication unit, etc.) for providing a wireless telephoning service via a mobile telephone network, which is not shown.

The control unit 110, as shown in FIG. 2, includes a CPU 110a, a ROM (Read Only Memory) 110b, a RAM (Random Access Memory) 110c, and an EEPROM (Electronically Erasable and Programmable ROM) 110d.

The CPU 110a executes programs stored on the ROM 110b and the EEPROM 110d with using the RAM 110c as a work area, and thereby controls operation of the various units of the terminal device 100. Note that the EEPROM 110d functions as a so-called address book, and stores telephone numbers, email addresses and the like in list form, in addition to storing data and programs, which will be described below.

The wireless communication IF unit 120 establishes a wireless link with the BS 210, under control of the control unit 110, and wirelessly performs data transmission and reception with the BS 210a. This wireless communication IF unit 120 wirelessly sends data received from the control unit 110 to the BS 210, and receives data wirelessly transmitted from the BS 210 and delivers the received data to the control unit 110.

The operating unit 130 is provided with operators such as a numeric keypad and cursor keys, and supplies signals (hereinafter, operating signals) that correspond to the content of operations on these operators by a user to the control unit 110. In other words, the operating unit 130 is for conveying to the control unit 110 the content of operations by a user with respect to the terminal device 100.

The display unit 140 includes a liquid crystal display and a drive circuit for the liquid crystal display, and displays images that correspond to image data supplied from the control unit 110.

The IC card IF unit 150 performs data transfer with the reading device of a contactless IC card, such as FeliCa™, for example. This IC card IF unit 150 is for mediating data communication between the control unit 110 operating in accordance with an application program that implements the above IC card function and the reading device, and implementing a settlement process according to the IC card function.

The ROM 110b stores a number of programs in advance. Hereinafter, these will be called "preinstalled programs". Exemplary preinstalled programs include a multitask operating system (hereinafter, "multitask OS"), a Java™ platform, and a native application.

A multitask OS is an operating system that supports various functions, such as allocation of virtual memory space required in order to implement pseudo-parallel execution of multiple tasks by a TSS (Time-Sharing System).

A Java platform is a group of programs described in accordance with a CDC (Connected Device Configuration), which is a configuration for implementing a Java execution environment (described below) in a mobile phone equipped with a multitask OS.

A native application is a program that allows the terminal device 100 to implement basic communication services such as Web page browsing and transmission/reception of emails, and is, for example, a so-called Web browser (browser 112, which will be described below) or an application (mailer 113, which will be described below) for receiving provision of an email transmission/reception service.

The EEPROM 110d has Java application storage areas in which Java application programs (hereinafter, denoted as "Java applications") are stored. A Java application has a JAR (Java Archive) file that includes a substantive program describing the actual processing procedures in the Java execution environment with an image file or audio file to be used following the execution of the substantive program, and an ADF (Application Descriptor File) that describes the storage location of the JAR file, environment variables to be set when the Java application is installed or run, and the like. A Java application is created by a CP (Contents Provider) and stored in a content server or the like, and is appropriately downloaded by using the above-mentioned Web browser.

Figure 3:
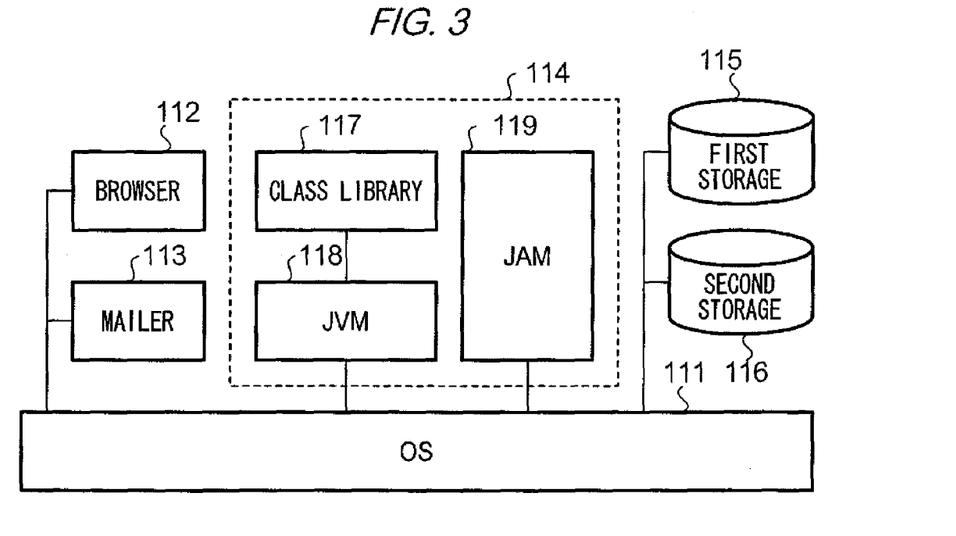
FIG. 3 shows an exemplary software module that is implemented as a result of a CPU 110a of the terminal device 100 executing various programs.

FIG. 3 shows an exemplary software module that is implemented as a result of the CPU 110a executing various programs stored in the ROM 110b and the EEPROM 110d. In the terminal device 100, a browser 112, a mailer 113 and a Java execution environment 114 are implemented on an OS 111, and a first storage 115 and a second storage 116 are secured in the EEPROM 110d, as shown in FIG. 3, as a result of the CPU 110a executing various programs.

The Java execution environment 114 is implemented by the Java platform stored in the ROM 110b. The Java execution environment 114 is composed of a class library 117, a JVM (Java Virtual Machine) 118, and a JAM (Java Application Manager) 119.

The class library 117 combines a group of program modules (class) having a specific function in a single file.

The JVM 118 has a function of interpreting and executing bytecode that is provided as a Java application, and is optimized for the above-mentioned CDC.

The JAM 119 has a function of managing the downloading, installation, startup/termination and the like of Java applications, and a function of restricting access to the first storages 115 and the second storages 116. Here, the access restriction function involves prohibiting access to each storage area by application programs other than the allocated application program (first process, first procedure), and specifically involves permitting each Java application that is executed by the JVM 118 to access (reading out and writing of information) only the first storage 115 and the second storage 116 corresponding to that Java application, and prohibiting access to other first and second storages. In other words, when the CPU 110a accesses the first storages 115 and the second storages 116, that access is performed under the control of the JAM. Note that the JAM 119 can access all first and second storages because of having a function of installing Java applications.

The first storage 115 is an area that stores a Java application (JAR file and ADF) downloaded under control of the JAM 119. The second storage 116 is an area for storing data generated during execution of a Java application after the Java application has been terminated, and individual storage areas are allocated for each Java application that is installed.

In the present embodiment, three types of Java applications, respectively called a "Wallet AP", a "Credit AP" and a "Point AP," are preinstalled on the terminal device 100. Here, the "Wallet AP" is an electronic money related Java application that allows the CPU 110a to implement a rechargeable electronic money function, such as Edy™, for example, the "Credit AP" is a credit card related Java application that allows the CPU 110a to implement a credit card function, and the "Point AP" is a mileage/points related Java application that allows the CPU 110a to implement a point card function.

In the present embodiment, the ADF of each Java application has written therein detailed information and basic information about the Java application.

Here, detailed information is information that is added or updated following use of an application program as aforementioned, and in the present embodiment, information indicating the usage history (purchase date/time, and purchase amount (number of points earned)) of a Java application is written in the ADF of that Java application as detailed information.

On the other hand, basic information is information that includes predetermined unique information about an application program and a digest generated from the detailed information as aforementioned, and in the present embodiment, the name of a Java application and an available balance (or accrued points) obtained by aggregating the detailed information (usage history) are written in the ADF of that Java application as basic information. Note that a digest, such as the above-mentioned available balance, is updated whenever detailed information is added or updated in the process of executing a Java application, by the CPU 110a operating in accordance with that Java application. Also, while the case where the above three types of Java applications are preinstalled on the terminal device 100 is described in the present embodiment, the number of Java applications that are installed on the terminal device 300 is not limited to three, and may be two, or four or more.

As aforementioned, the JAM 119 is for performing startup management of Java applications, and, specifically, causes the CPU 110a to execute processes that will be described hereinafter.

First is a process of causing the display unit 140 to display a window (hereinafter, basic information window) in which the basic information is arranged in list form, in order to allow the user to select which of the three Java applications to run.

Second is a process where, if a cursor is moved to the display position of one of the pieces of basic information included in the basic information window as a result of the user appropriately operating the operating unit 130, detailed information corresponding to the basic information where the cursor is positioned is read out from the appropriate ADF and displayed on the display unit 140, while detailed information corresponding to the basic information displayed adjacent to the basic information where the cursor is positioned is read out from the appropriate ADF to the RAM 110c.

Here, in the case where the cursor is moved as a result of the user operating a cursor key, there is a high possibility that the cursor will next be moved to the display position of basic information displayed adjacent to the basic information where the cursor is now positioned. Hereinafter, the zone where there is a high possibility of the cursor being moved to next will be referred to as the vicinity of the display position of the basic information where the cursor is positioned at that time. By reading detailed information corresponding to the basic information displayed in the vicinity of the basic information where the cursor is positioned ahead of time as discussed above, the display of detailed information according to the movement of the cursor can be performed quickly.

The configuration of the terminal device 100 is as described above.

As discussed above, the hardware configuration of the terminal device 100 is the same as the hardware configuration of a mobile phone provided with a program execution function, and functions characteristic of the terminal device according to the present invention are implemented by a software module.

Next, operations characteristic of the terminal device according to the present embodiment, out of operations that the CPU 110a performs in accordance with the JAM 119, will be described with reference to the drawings. Note that with the exemplary operations discussed hereinafter, it is assumed that the aforementioned three types of Java applications are installed on the terminal device 100. Also, with the exemplary operations discussed hereinafter, it is assumed that the power supply (not shown) of the terminal device 100 has already been applied, and that the CPU 110a is operating in accordance with a multitask OS.

The user of the terminal device 100 is able to instruct the startup of the Java execution environment 114, by appropriately operating the operating unit 130. The CPU 110a, having received an operating signal that corresponds to such an instruction from the operating unit 130, firstly starts the JAM 119. The CPU 110a operating in accordance with the JAM 119 executes a basic information display process that will be described hereinafter.

Figure 4:
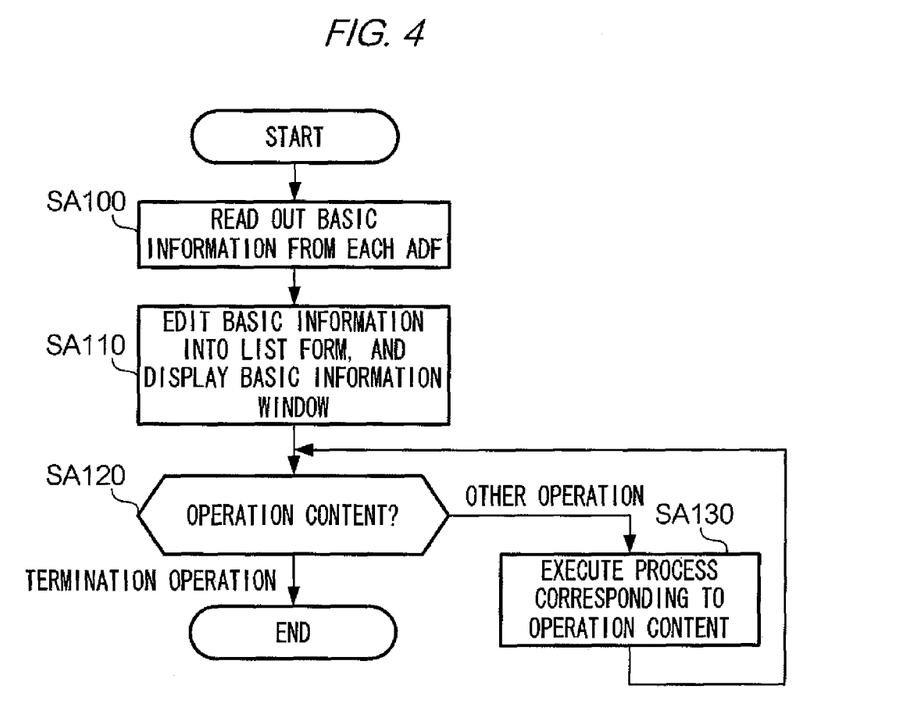
FIG. 4 is a flowchart showing the flow of a basic information display process that the CPU 110a performs in accordance with a JAM.

FIG. 4 is a flowchart showing the flow of the basic information display process that the CPU 110a performs in accordance with the JAM 119. As shown in FIG. 4, the CPU 110a firstly reads out basic information from the respective ADFs, with regard to each of the Java applications stored in the first storages 115 (step SA100). The CPU 110a causes the display unit 140 to display a basic information window in which the basic information has been edited into list form (step SA110 (second process, second procedure)).

Note that the CPU 110a, when editing the basic information of the Java applications read out at step SA100 into list form, writes data showing the display position of the basic information of each Java application in the basic information window to the RAM 110c, in association with an identifier (e.g., character string indicating the filename of the Java application) that uniquely identifies the Java application. The data thus written to the RAM 110c is used when the CPU 110a is made to specify a Java application corresponding to the basic information where the cursor is positioned in the basic information window.

Figure 5:
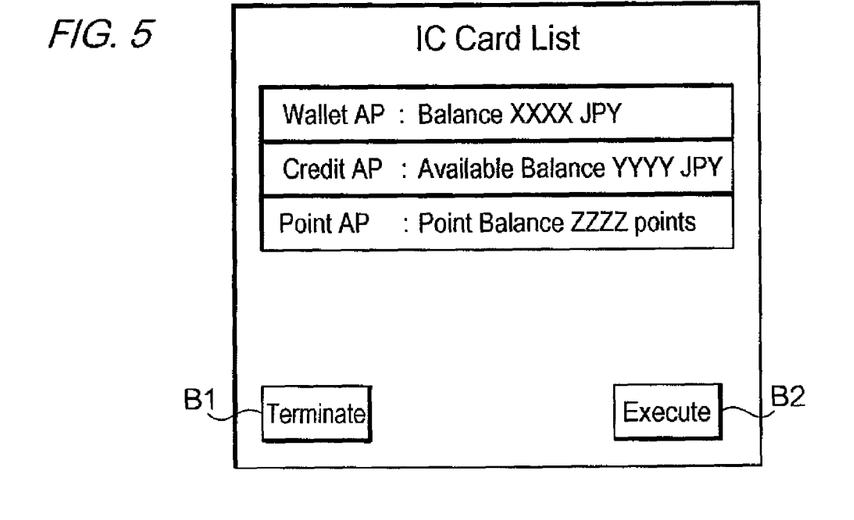
FIG. 5 shows an exemplary basic information window that is displayed on a display unit 140.

FIG. 5 shows an exemplary basic information window that the CPU 110a causes the display unit 140 to display at step SA110. As shown in FIG. 5, in this basic information window, basic information about the Java applications installed on the terminal device 100 is displayed in list form.

The basic information window shown in FIG. 5 is a window for allowing the user of the terminal device 100 to select a Java application that he or she wants to run or a Java application whose detailed information he or she wants to view, and the user looking at this basic information window is able to perform operations that will be discussed hereinafter, by appropriately operating the operating unit 130.

That is, a termination operation instructing that execution of the JAM 119 be terminated (in the exemplary operations, pressing of key corresponding to a Terminate button B1 in FIG. 5), a cursor move operation for designating an application whose detailed information the user wants to display (in the exemplary operations, pressing of up or down cursor key), and an application execution operation instructing execution of the Java application where the cursor is positioned (in the exemplary operations, pressing of key corresponding to an Execute button B2 in FIG. 5).

On the other hand, the operating unit 130, by outputting an operating signal that corresponds to the content of the operation by the user to the control unit 110, conveys the operation content. The CPU 110a operating in accordance with the JAM 119 determines whether the termination operation was performed or whether an operation other than the termination operation was performed, by analyzing the operating signal (FIG. 4: step SA120).

In the case where it is determined at step SA120 that "the termination operation was performed," the CPU 110a causes the display unit 140 to clear the basic information window, and terminates execution of the JAM 119.

Conversely, in the case where it is determined that "an operation other than the termination operation was performed," the CPU 110a executes a process that corresponds to the content of that operation (FIG. 4: step SA130). Specifically, if it is determined that "a cursor move operation was performed," the CPU 110a executes "a detailed information display process" at step SA120, and if it is determined that "the application execution operation was performed," the CPU 110a executes "an application execution process" at step SA120.

Hereinafter, the detailed information display process and the application execution process will be described in detail with reference to the drawings.

Figure 6:
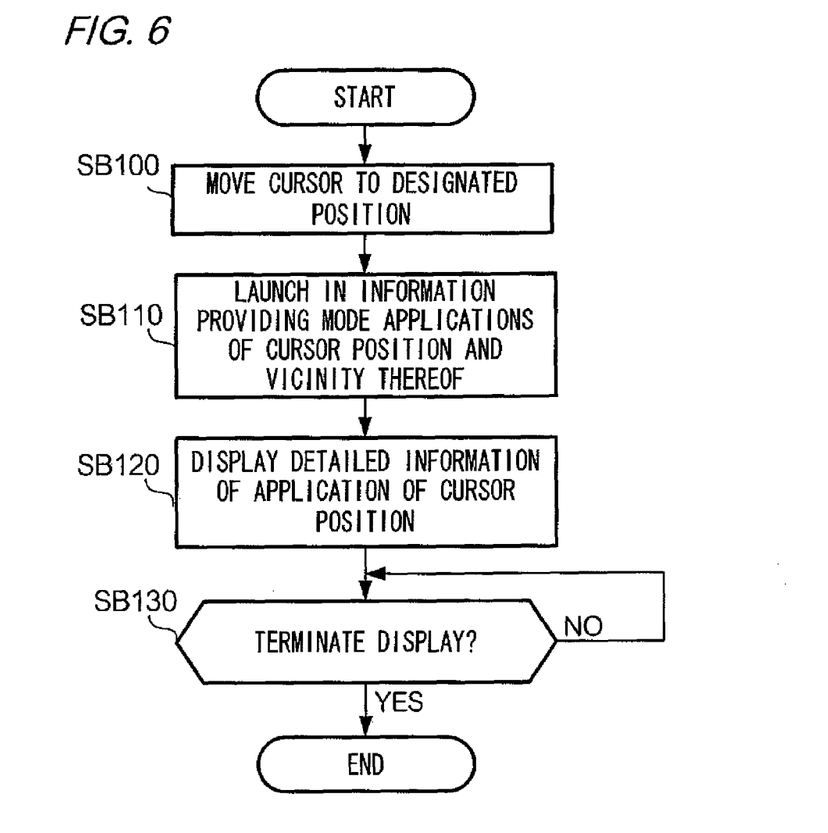
FIG. 6 is a flowchart showing the flow of a detailed information display process that the CPU 110a performs in accordance with the JAM.

Firstly, the detailed information display process that the CPU 110a executes at step SA130 of FIG. 4 in the case where it is determined at step SA120 of FIG. 4 that "a cursor move operation was performed" will be described with reference to the drawings. FIG. 6 is a flowchart showing the flow of the detailed information display process that the CPU 110a operating in accordance with the JAM 119 executes.

As shown in FIG. 6, the CPU 110a moves the cursor to a position instructed by the user (step SB100 (third process, third procedure)). Next, the CPU 110a specifies the Java application corresponding to that cursor position, with reference to the storage content of the RAM 110c. The CPU 110a reads out the detailed information of that Java application and the detailed information of a Java application whose basic information is displayed in the vicinity thereof (both sides of the cursor position in the present embodiment) from the respective ADFs, and stores the detailed information to the RAM 110c (step SB110 (fourth process, fourth procedure)).

For example, in the case where the cursor is positioned at the basic information of the "Credit AP" in the basic information window shown in FIG. 5, detailed information about the "Credit AP", the "Wallet AP" and the "Point Card AP" is read out from the respective ADFs and stored in the RAM 110c in step SB110.

Next, the CPU 110a causes the display unit 140 to display the detailed information corresponding to the cursor position, out of the detailed information that was stored to the RAM 110c (step SB120 (fifth process, fifth procedure)).

Figure 7:
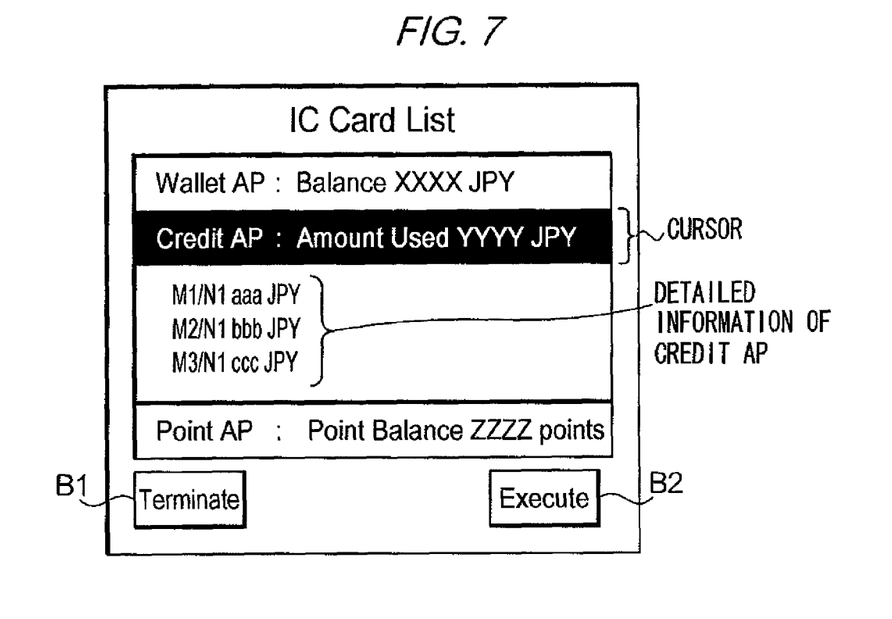
FIG. 7 shows an exemplary detailed information window that is displayed on the display unit 140.

As aforementioned, in the case where the cursor is positioned at the "Credit AP" in the basic information window shown in FIG. 5, detailed information about the "Credit AP" is displayed as shown in FIG. 7. Note that while the case where detailed information corresponding to the basic information where the cursor is positioned is displayed adjacent to that basic information as shown in FIG. 5 was described in the present embodiment, the display of detailed information may be performed using a separate window, such as a popup window.

Note that in the case where the cursor is moved to the basic information of a Java application (e.g., "Wallet AP") whose detailed information was stored in the RAM 110c at step SB110, the detailed information stored in the RAM 110c need only be displayed on the display unit 140, without reading out detailed information from an ADF.

Also, while the case where the vicinity of the basic information where the cursor is positioned denotes both sides of the cursor position was described in the present embodiment, the vicinity is not limited to one place on both sides, and may denote two or more places on both sides. In short, the number of pieces of detailed information read out ahead of time need only be appropriately determined according to the storage capacity of the RAM 110c.

Also, in the case where the cursor is positioned at the basic information displayed at the top (or bottom) of the list in the basic information window, only the detailed information corresponding to the one piece of basic information displayed adjacent thereto need be read out from an ADF. Also, in the case where the detailed information to be read out ahead of time is already stored in the RAM 110c, detailed information need not be read out from the corresponding ADF at step SB110.

Subsequently, the CPU 110a determines whether an operation for instructing termination of detailed display (e.g., pressing of key corresponding to the Terminate button B1 in a state where detailed information is displayed) has been performed (step SB 130). The CPU 110a repeatedly executes the processing of step SB130 until the determination result is "Yes", and terminates the detailed information display process when the determination result is "Yes".

The detailed information display process that the CPU 110a performs in accordance with the JAM 119 is as described above.

Next, the application execution process that the CPU 110a executes at step SA130 of FIG. 4 in the case where it is determined at step SA120 of FIG. 4 that "the application execution operation was performed" will be described with reference to the drawings.

Figure 8:
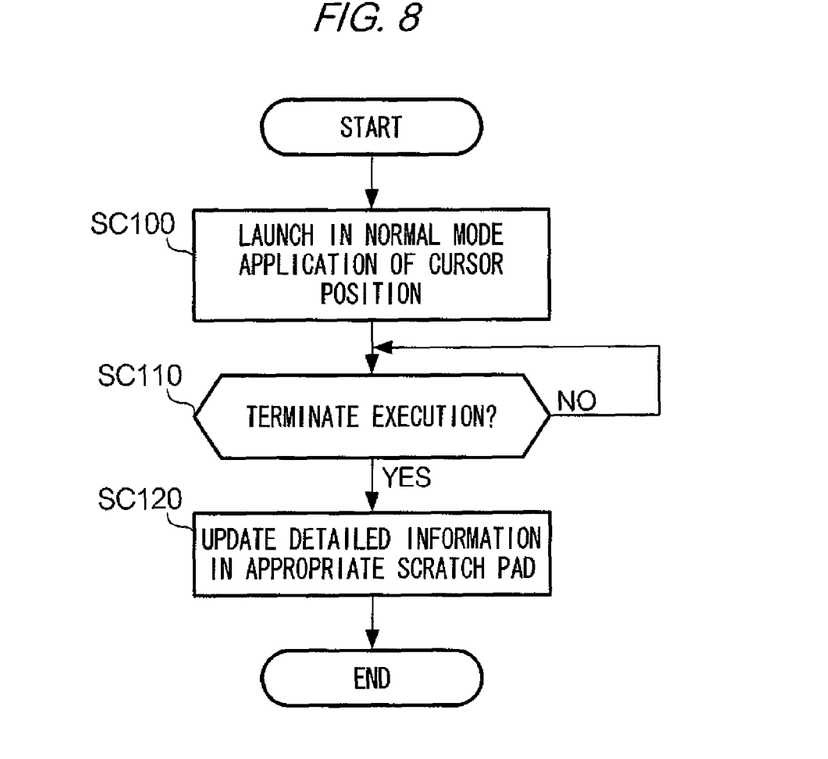
FIG. 8 is a flowchart showing the flow of an application execution process that the CPU 110a performs in accordance with the JAM.

FIG. 8 is a flowchart showing the flow of the application execution process that the CPU 110a operating in accordance with the JAM 119 executes. As shown in FIG. 8, the CPU 110a reads out the Java bytecode of the appropriate Java application (i.e., Java application corresponding to the basic information where the cursor is positioned at the time that the key corresponding to the Execute button B2 of FIG. 5 is pressed) from the first storage 115 corresponding to that Java application, and starts execution thereof using the JVM 118 (step SC100).

For example, the CPU 110*a*, while executing the Credit AP, is able to communicate with the credit card reading device and perform a credit settlement via the IC card IF unit 150. Note that in the case where a credit settlement is thereby performed, information about the settlement (settlement date, settlement amount) is stored in the second storage 116 corresponding to the Credit AP.

Subsequently, the CPU 110*a* determines whether an operation for instructing termination of the application has been performed (step SC110). The CPU 110*a* repeatedly executes the processing of step SC110 until the determination result is "Yes", and updates the detailed information stored in the ADF, according to the execution result of the Java application, when the determination result is "Yes" (step SC120). Note that in the case where detailed information about the Java application executed at step SC100 is stored in the RAM 110*c*, the CPU 110*a* may perform updating of the detailed information stored in the RAM 110*c* synchronously with updating of the detailed information in the ADF.

As discussed above, in the terminal device 100 according to the present embodiment, because not only the detailed information of the Java application corresponding to the cursor position but also the detailed information of Java applications whose basic information is displayed in the vicinity thereof is read ahead of time by the CPU 110*a*, the appropriate detailed information can be displayed quickly, in the case where an operation moving the cursor to the basic information displayed in the vicinity thereof is performed.

In addition, in the present embodiment, since basic information and detailed information about each Java application is written in an ADF, and an access restriction by the JAM 119 is imposed with respect to the first storages 115 in which these ADFs are stored, security for the detailed information is ensured.

Thus, according to the present embodiment, the display of detailed information can be performed quickly, while ensuring security for the detailed information of each Java application.

In the above-mentioned embodiment, the case was described where the terminal device 100 has a Java execution environment compatible with a CDC as a program execution environment. However, the program execution environment that the terminal device 100 has may be a Java execution environment compatible with a CLDC, or the terminal device 100 may have a program execution environment other than a Java execution environment.

Note that an exemplary application program that is executed in a program execution environment other than a Java execution environment includes a program created and compiled in another programming language, such as C++.

In the above-mentioned embodiment, the case was described where the present invention is provided in a mobile phone that has a program execution environment and can be accommodated in a mobile packet communication network. However, the application target of the present invention is not limited to a mobile phone as discussed above, and may be a PDA, a notebook personal computer, a desktop personal computer or the like, provided the terminal device has a program execution environment.

While the case where the Java applications installed on the terminal device 100 are application programs that allow the terminal device 100 to implement an IC card function was described in the above-mentioned embodiment, the application programs may be games or the like, for example. In the case of games or the like, consideration need not be given to ensuring security, unlike application programs for implementing an IC card function, although there is no change in terms of being able to perform quick detailed display with regard to games or the like, by applying the present invention.

Note that exemplary basic information and detailed information about an application program that implements a game function, in the case of a role-playing game (a game where a user controls the hero and his cohorts, and create a story while developing the hero and cohorts; hereinafter, RPG), for example, includes the name of the hero, levels showing the degree of character development, and the playing time as basic information, and the names and levels of the hero's cohorts, and the names of the equipment and possessions of the hero and his cohorts as detailed information.

In the above-mentioned embodiment, the case was described where the usage history of a Java application is used as detailed information about that Java application. However, with regard to a mileage/points related Java application in which benefits are awarded to users according to the number of accrued miles (points), for example, detailed information may include information describing the benefits for every given number of accrued miles (points) (e.g., character string information indicating a description of the content of benefits) or information describing a method of exchanging benefits and accrued miles (points), or with regard to a mileage/points related Java application that performs promotional advertising targeted to users according to the number of accrued miles (points), detailed information may include information describing promotions being held at the time that the Java application is used (e.g., character string information indicating a description of the content of promotions).

Also, in the above-mentioned embodiment, the case was described where the name of a Java application and an available balance (or accrued points) obtained by aggregating detailed information (usage history) are used as basic information about that Java application. However, in addition to the name, the basic information may include the version, data size, startup parameters or type (e.g., "rechargeable electronic money" with regard to the "Wallet AP", "credit card" with regard to the "Credit AP", etc.) of the Java application or image data indicating an icon that represents the Java application, or these may be used instead of the name. In addition to the available balance (or accrued points), the last update date or last usage date of the Java application may be used as the aforementioned digest. Note that while it is essential that information unique to each Java application program be included in the basic information, it is not essential for a digest generated from detailed information to be included in the basic information. The content of the basic information need only be determined arbitrarily according to the specifications/design of the terminal device 100.

While the case where basic information and detailed information about each Java application are written in an ADF of the Java application was described in the above-mentioned embodiment, the area where the basic information and the detailed information are described is not limited to an ADF. The basic information and the detailed information may be described in any area, provided a different storage area is allocated to each of a plurality of application programs.

Also, it is acceptable if only the basic information is written in an ADF, and the detailed information is acquired using the Java application. In such an embodiment, to enable quick acquisition of detailed information, two modes including a normal operation mode for performing normal operation and an information providing mode for performing only supply of detailed information to the JAM may be provided in the Java application, and the Java application corresponding to the basic information where the cursor is positioned in the basic information window may be run in the information providing mode, and detailed information about that Java application supplied to the JAM.

Also, storage means for storing ADFs and JAR files is not limited to the EEPROM 110*d*, and may be storage means in an IC card.

In the above-mentioned embodiment, the case was described where a JAM characteristic of the terminal device according to the present invention is prestored in the ROM 110*b*. However, the JAM 119 may be distributed in a state of being stored on a computer device readable recording medium (e.g., CD-ROM (Compact Disk-Read Only Memory) or DVD (Digital Versatile Disk), etc.). Alternatively, the JAM may be distributed by download via a telecommunications line such as the Internet.

Also, while the case where a JAM performs display of basic information about each Java application and display of detailed information about a Java application selected by a user was described in the above-mentioned embodiment, a dedicated application program may perform display of basic information and detailed information. However, since the ADFs of other Java applications need to be accessed in order to perform display of basic information and detailed information, the application program implementing such a display function must be a native application that was installed at the time of shipment of the terminal device 100, or an application program with respect to which it is sufficiently guaranteed using an SDF, for example, that the application has not been created with malicious intent, such as the leaking of information.

Also, display of detailed information about a Java application selected by a user may be performed by the Java application itself. Specifically, a Java application selected by a user may be run in a mode for performing only acquisition and display of detailed information, instead of the information providing mode. At this time, the display window of the Java application is displayed on top. Similarly, the Java application may also display the digest generated from detailed information, out of the basic information.

In the case of updating a Java application program to a new version, a procedure such as the following is performed.

Firstly, the CPU 110*a* acquires an ADF of the Java application program that has been upgraded from a server device or the like on the Internet. In this ADF is described a URL which is the storage location of a JAR file of the upgraded Java application program. The CPU 110*a* acquires the JAR file in accordance with this URL. The CPU 110*a* updates the Java application to the new version, by overwriting the pre-update ADF and JAR file with the acquired ADF and JAR file. At this time, the CPU 110*a* rewrites the basic information from the pre-update content to the post-update content, while not rewriting the detailed information from the pre-update content to different content. Specifically, the CPU 110*a*, with regard to the basic information, overwrites the content of the pre-update ADF with the content described in the ADF acquired at the time of update. On the other hand, the CPU 110*a*, with regard to the detailed information, describes (transcribes) the content described in the pre-update ADF in the ADF acquired at the time of update.

The content of the basic information may differ before and after the upgrade. For example, the name "Wallet AP" may change to "Change Purse AP". In such a case, because the CPU 110*a* overwrites the basic information described in the pre-update ADF with the basic information described in the ADF acquired at the time of update, post-update basic information can be displayed when displaying the basic information. With regard to the detailed information, on the other hand, because the content described in the pre-update ADF is described in the post-update ADF, detailed information such as the credit usage history stored up to the updating can be displayed uninterruptedly even after the updating.

The hardware configuration of the terminal device and other devices is not limited to that described in the embodiments. These devices may have any hardware configuration, provided the hardware configuration is able to implement the required functional configuration. For example, in the above-mentioned embodiment, the CPU 110*a* of the terminal device 100 has a plurality of functions, specifically, functions that serve as control means for performing the first to fifth processes. However, at least some of these functions (i.e., these processes) may be implemented using a different hardware element to the CPU 110*a*.

What is claimed is:

1. A terminal device comprising:
   display means;
   control means;
   operating means; and
   storage means in which a different storage area is allocated to each of a plurality of application programs, each of the storage area storing detailed information and basic information, the detailed information being information that is added or updated following use of the application program, the basic information including predetermined unique information about the application program,
   wherein the control means is configured to execute:
   a first process of prohibiting, with respect to each storage area, access by application programs other than the allocated application program;
   a second process of causing the display means to display a window that includes the basic information of each of the plurality of application programs;
   a third process of moving a cursor to a position where one of the pieces of basic information is displayed in the window, according to content of an operation on the operating means;
   a fourth process of reading out, from the storage means, the detailed information of a first application program corresponding to the basic information where the cursor is positioned in the third process, and the detailed information of a second application program whose basic information is displayed in a vicinity of the basic information of the first application program in the window; and
   a fifth process of displaying the detailed information about the first application program on the display means.

2. The terminal device according to claim 1, wherein the basic information includes a digest that is generated from the detailed information, in addition to the predetermined unique information.

3. The terminal device according to claim 1, wherein the control means, in the fifth process, runs the first application program and displays the detailed information thereof on the display means.

4. The terminal device according to claim 1, wherein the control means, in the fifth process, displays the window that includes the detailed information of the first application program on the display means.

5. The terminal device according to claim 1, wherein the control means is configured to execute:
   a sixth process of updating the application program; and
   a seventh process of rewriting, with regard to the basic information of the application program updated in the sixth process, pre-update content to post-update content, and not rewriting, with regard to the detailed information of the updated application program, pre-update content to different content.

6. A terminal device comprising:
display means;
control means;
operating means; and
storage means for storing a unique ADF (Application Descriptor File) for each of a plurality of Java™ application programs, the ADF of each Java application program having described therein detailed information, which is information that is added or updated following use of the Java application program, and basic information that includes predetermined unique information about the Java application program,
wherein the control means is configured to execute:
a first process of prohibiting, with respect to each ADF, access by Java application programs other than the Java application program corresponding to the ADF, under control of a JAM (Java Application Manager);
a second process of reading out the basic information of each of the plurality of application programs from the ADFs stored in the storage means, and causing the display means to display a window that includes the basic information, under control of the JAM;
a third process of moving a cursor to a position where one of the pieces of basic information is displayed in the window, according to content of an operation on the operating means;
a fourth process of reading out, from the ADFs stored in the storage means, the detailed information of a first application program corresponding to the basic information where the cursor is positioned in the third process, and the detailed information of a second application program whose basic information is displayed in a vicinity of the basic information of the first application program in the window, under control of the JAM; and
a fifth process of displaying the detailed information about the first application program on the display means.

7. The terminal device according to claim 6, wherein the control means is configured to execute:
a sixth process of updating the Java application program, by acquiring an ADF and further acquiring a JAR file in accordance with content described in the ADF; and
a seventh process of rewriting, with regard to the basic information of the Java application program updated in the sixth process, content described in the pre-update ADF to content described in the ADF acquired at the time of update, and describing, with regard to the detailed information of the updated application program, content described in the pre-update ADF in the ADF acquired at the time of update.

8. A program for causing a computer device to execute a process, the process comprising:
a first procedure of prohibiting, with respect to each ADF (Application Descriptor File) in storage means for storing a unique ADF for each of a plurality of Java application programs, the ADF of each Java application program having described therein detailed information, which is information that is added or updated following use of the Java application program, and basic information that includes predetermined unique information about the Java application program, access by application programs other than the allocated application program, under control of a JAM (Java Application Manager);
a second procedure of causing display means to display a window that includes the basic information of each of the plurality of application programs;
a third procedure of moving a cursor to a position where one of the pieces of basic information is displayed in the window, according to content of an operation on operating means;
a fourth procedure of reading out, from the storage means, the detailed information of a first application program corresponding to the basic information where the cursor is positioned in the third procedure, and the detailed information of a second application program whose basic information is displayed in a vicinity of the basic information of the first application program in the window; and
a fifth procedure of displaying the detailed information of the first application program on the display means.

9. A program for causing a computer device to execute a process, the process comprising:
a first procedure of prohibiting, with respect to each storage area in storage means in which a different storage area is allocated to each of a plurality of application programs, and stored in the storage area allocated to each application program are detailed information, which is information that is added or updated following use of the application program, and basic information that includes predetermined unique information about the application program, access by application programs other than the allocated application program;
a second procedure of reading out the basic information of each of the plurality of application programs from the ADFs stored in the storage means, and causing the display means to display a window that includes the basic information, under control of the JAM;
a third procedure of moving a cursor to a position where one of the pieces of basic information is displayed in the window, according to content of an operation on operating means;
a fourth procedure of reading out, from the ADFs stored in the storage means, the detailed information of a first application program corresponding to the basic information where the cursor is positioned in the third procedure, and the detailed information of a second application program whose basic information is displayed in a vicinity of the basic information of the first application program in the window, under control of the JAM; and
a fifth procedure of displaying the detailed information about the first application program on the display means.

* * * * *